(12) United States Patent
Tsai (10) Patent No.: US 8,137,152 B2
(45) Date of Patent: Mar. 20, 2012

(54) REMOTE CONTROL BALL ASSEMBLY

(75) Inventor: Iin Wei Tsai, Hsinchu (TW)

(73) Assignee: Fun Tram Corporation, Jubei, Hsinchu (TW)

( * ) Notice: Subject to any disclaimer, the term of this patent is extended or adjusted under 35 U.S.C. 154(b) by 150 days.

(21) Appl. No.: 12/800,958

(22) Filed: May 25, 2010

(65) Prior Publication Data

US 2011/0294397 A1    Dec. 1, 2011

(51) Int. Cl.
*A63H 30/04* (2006.01)
*A63H 17/34* (2006.01)

(52) U.S. Cl. ........................... 446/456; 446/409

(58) Field of Classification Search .................. 446/409, 446/454, 456, 465, 484; 180/6.2, 6.48, 6.5
See application file for complete search history.

(56) References Cited

U.S. PATENT DOCUMENTS

| | | | | |
|---|---|---|---|---|
| 3,500,579 A | * | 3/1970 | Bryer | 446/462 |
| 3,696,557 A | * | 10/1972 | Ruppel | 446/444 |
| 3,722,134 A | * | 3/1973 | Merrill et al. | 446/462 |
| 4,438,588 A | | 3/1984 | Martin | |
| 4,471,567 A | * | 9/1984 | Martin | 446/437 |
| 4,927,401 A | * | 5/1990 | Sonesson | 446/456 |
| 5,041,051 A | * | 8/1991 | Sonesson | 446/456 |
| 5,439,408 A | * | 8/1995 | Wilkinson | 446/409 |
| D375,986 S | * | 11/1996 | Wilkinson et al. | D21/398 |
| 6,408,230 B2 | * | 6/2002 | Wada | 701/1 |
| 6,550,089 B1 | * | 4/2003 | Ussen | 15/3 |
| 6,988,570 B2 | * | 1/2006 | Takeuchi | 180/6.48 |

* cited by examiner

*Primary Examiner* — Kien Nguyen
(74) *Attorney, Agent, or Firm* — Charles E. Baxley (57) ABSTRACT

A remote control ball assembly includes a housing, an actuating device having a circuit board disposed in the housing and having a processing device and a signal receiving device attached to the circuit board, two motors each include a wheel attached to a spindle and contacted with the housing, and a radio transmitter includes another processing device and an angle detector and a signal emitting device attached to another circuit board for detecting a status of the radio transmitter and for emitting the status signal to the signal receiving device, which then actuates the motors and the wheels to operate or to move the housing on land and on water without being operated by the fingers of the user.

9 Claims, 8 Drawing Sheets

REMOTE CONTROL BALL ASSEMBLY

BACKGROUND OF THE INVENTION

1. Field of the Invention

The present invention relates to a remote control ball assembly, and more particularly to a remote control ball assembly including an improved control mode or structure for allowing the remote control ball to be suitably controlled by the user and for preventing the fingers of the user from being fatigued by actuating or operating the remote control device or radio transmitter.

2. Description of the Prior Art

Typical remote control balls comprise a ball or sphere, and a remote-control powered vehicle disposed within the ball or sphere for moving the remote-control powered ball or sphere on land and on water.

For example, U.S. Pat. No. 4,438,588 to Martin discloses one of the typical remote control balls comprising transparent or color ball portions and forward-illuminating spotlight, a remote-control powered vehicle disposed within the ball portions, and provisions for determining vehicle orientation for more efficient control. For example, a radio transmitter is provided for actuating or operating the remote-control powered vehicle and the powered ball portions. Normally, the remote-control radio transmitter includes two or more switch keys or buttons for being moved or actuated or operated by the user.

However, the switch keys of the remote-control radio transmitter should be moved or depressed or actuated or operated by the fingers of the user frequently, particularly the thumb of the user, and the thumb or the fingers of the user will be easily and quickly fatigued by actuating or operating the remote control device or radio transmitter.

The present invention has arisen to mitigate and/or obviate the afore-described disadvantages of the conventional remote control balls.

SUMMARY OF THE INVENTION

The primary objective of the present invention is to provide a remote control ball assembly including an improved control mode or structure for allowing the remote control ball to be suitably controlled by the user and for preventing the fingers of the user from being fatigued by actuating or operating the remote control device or radio transmitter.

In accordance with one aspect of the invention, there is provided a remote control ball assembly comprising a housing including a chamber formed therein, an actuating device including a first circuit board disposed in the chamber of the housing, a first processing device attached to the first circuit board, and at least one signal receiving device attached to the first circuit board and electrically coupled to the first processing device, two motors attached to the first circuit board and electrically connected to the first processing device, the motors each including a spindle and a wheel attached to the spindle, and the wheels being contacted with the housing for allowing the housing to be actuated by the wheels, and a radio transmitter including a second circuit board, a second processing device attached to the second circuit board, an angle detector attached to the second circuit board and electrically coupled to the second processing device for sensing or detecting a tilted or inclination status of the radio transmitter and for transmitting a detected signal to the second circuit board which processes the detected signal to a processed signal, and a signal emitting device attached to the second circuit board and electrically connected to the second processing device for emitting the processed signal processed by the second processing device to the signal receiving device which then transmit the received signals to the first processing device, in order to actuate the motors and the wheels to operate or to move the housing on land and on water without being actuated or operated or depressed by the fingers of the user.

The radio transmitter includes a gyro detector attached to the second circuit board and electrically connected to the second processing device for further sensing or detecting a tilted or inclination status of the radio transmitter. The angle detector may be selected from a G-sensor, an acceleration sensor or an inclination angle detector.

The signal receiving device may be selected from an infrared ray receiving device. The signal emitting device may be selected from an infrared ray signal emitting device.

The radio transmitter includes a weight member for balancing purposes or for erecting the housing. For example, the weight member may be attached to the motors, or may be directly attached to the circuit board.

The housing may include a spherical structure or a polygonal structure for allowing the housing to be moved on land and on water.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-5, a remote control ball assembly 1 in accordance with the present invention comprises a ball member or outer housing 10 including two or more housing members 11, 12 mounted or secured together to form a ball or spherical or polygonal structure and including a chamber 13 formed therein, such as formed in the housing members 11, 12 for receiving a transmitting or operating or actuating device 3 therein. For example, the actuating device 3 includes a plate or circuit board 30 disposed in the chamber 13 of the housing members 11, 12 or of the housing 10, a controlling or operating or processing device 31 attached or mounted or secured to the circuit board 30, and one or more (such as two) receivers or signal receiving devices 32, 33, such as infrared ray receiving devices 32, 33 also attached or mounted or secured to the circuit board 30 and electrically coupled or connected to the controlling or processing device 31.

Figure 1:
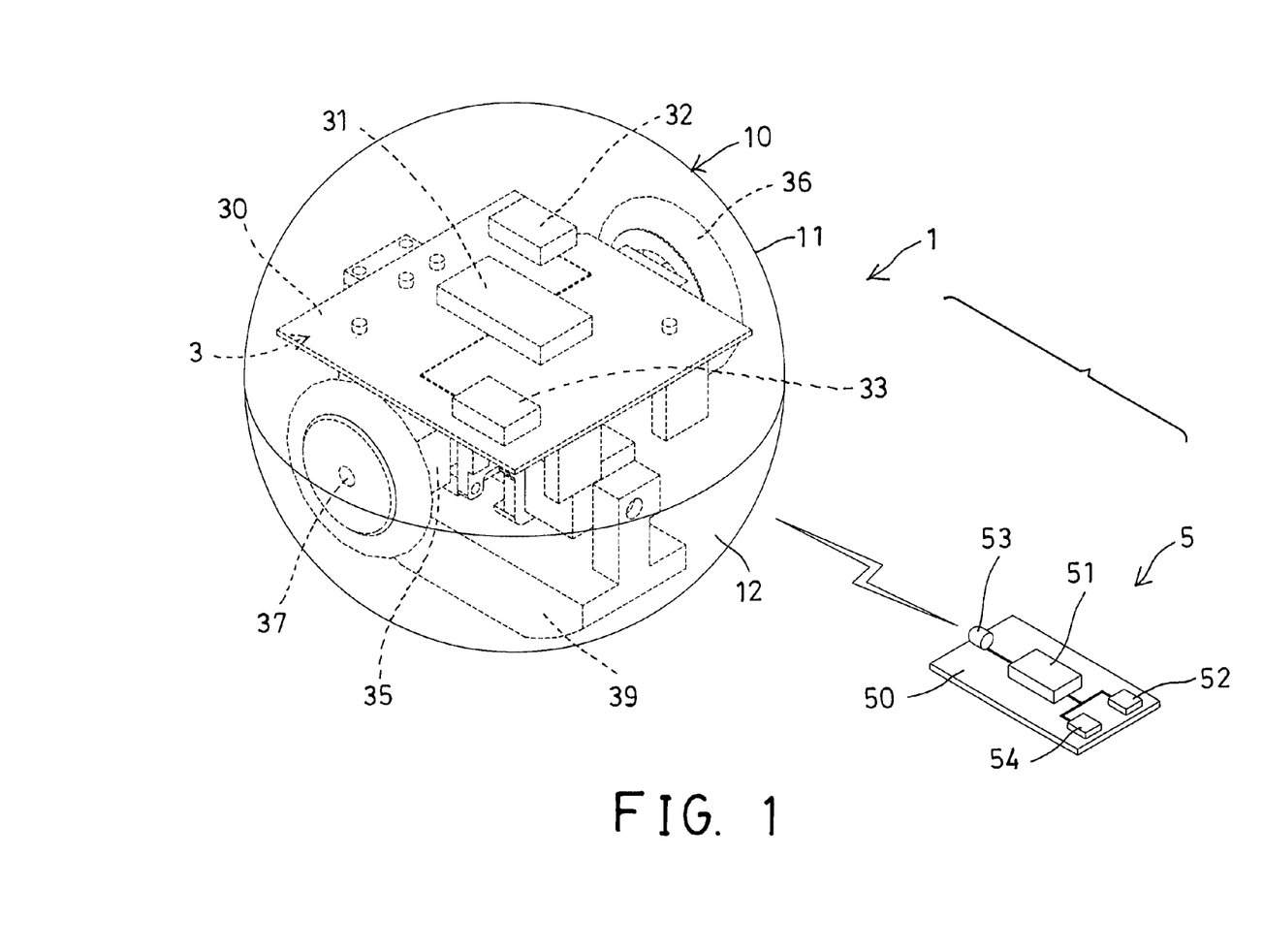
FIG. 1 is a perspective view of a remote control ball assembly in accordance with the present invention.
Figure 2:
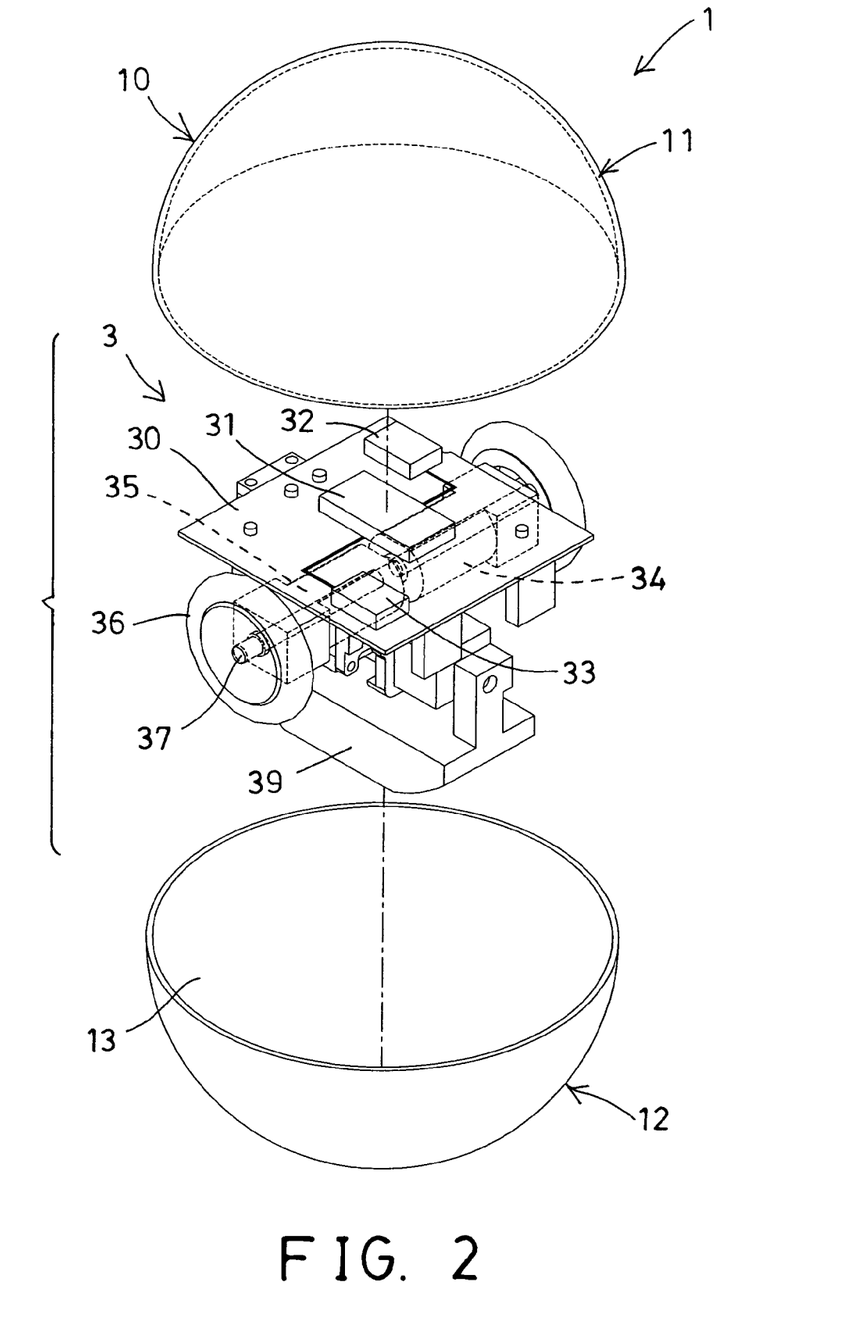
FIG. 2 is a partial exploded view of THE remote control ball assembly.
Figure 3:
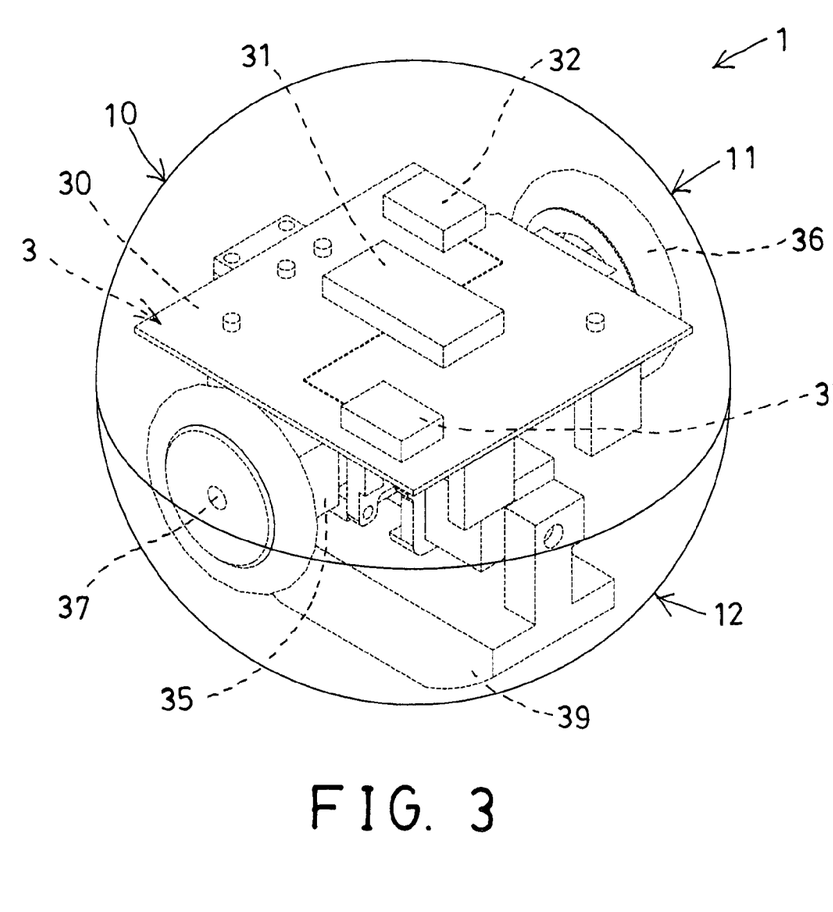
FIG. 3 is a perspective view of a ball of the remote control ball assembly.
Figure 4:
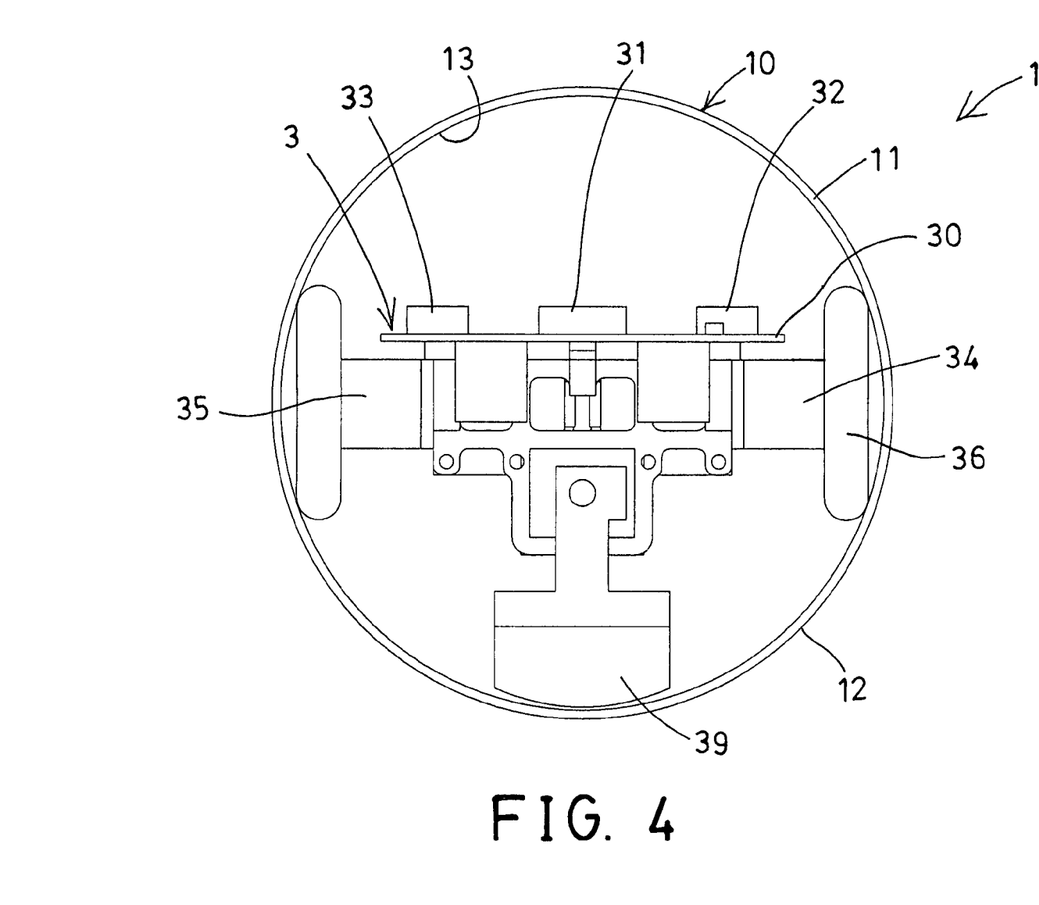
FIG. 4 is a side or end plan schematic view of the ball of the remote control ball assembly.

One or more (such as two) motors 34, 35 are further provided and attached or mounted or secured to the circuit board 30, such as attached or mounted to the bottom portion of the circuit board 30 and electrically coupled or connected to the processing device 31, and the motors 34, 35 each include a roller or wheel 36 attached or mounted or secured to a spindle 37 thereof, for driving or rotating the wheels 36 relative to the motors 34, 35 and the housing 10, the wheels 36 are contacted or engaged with the housing members 11, 12 of the housing 10, as best shown in FIG. 4, for allowing the housing 10 to be moved or actuated or operated by the wheels 36 and to be moved on land and on water. A weight member 39 may further be provided and attached or mounted or secured to the motors 34, 35, or directly attached or mounted to the circuit board 30 for balancing or erecting the housing 10.

Figure 5:
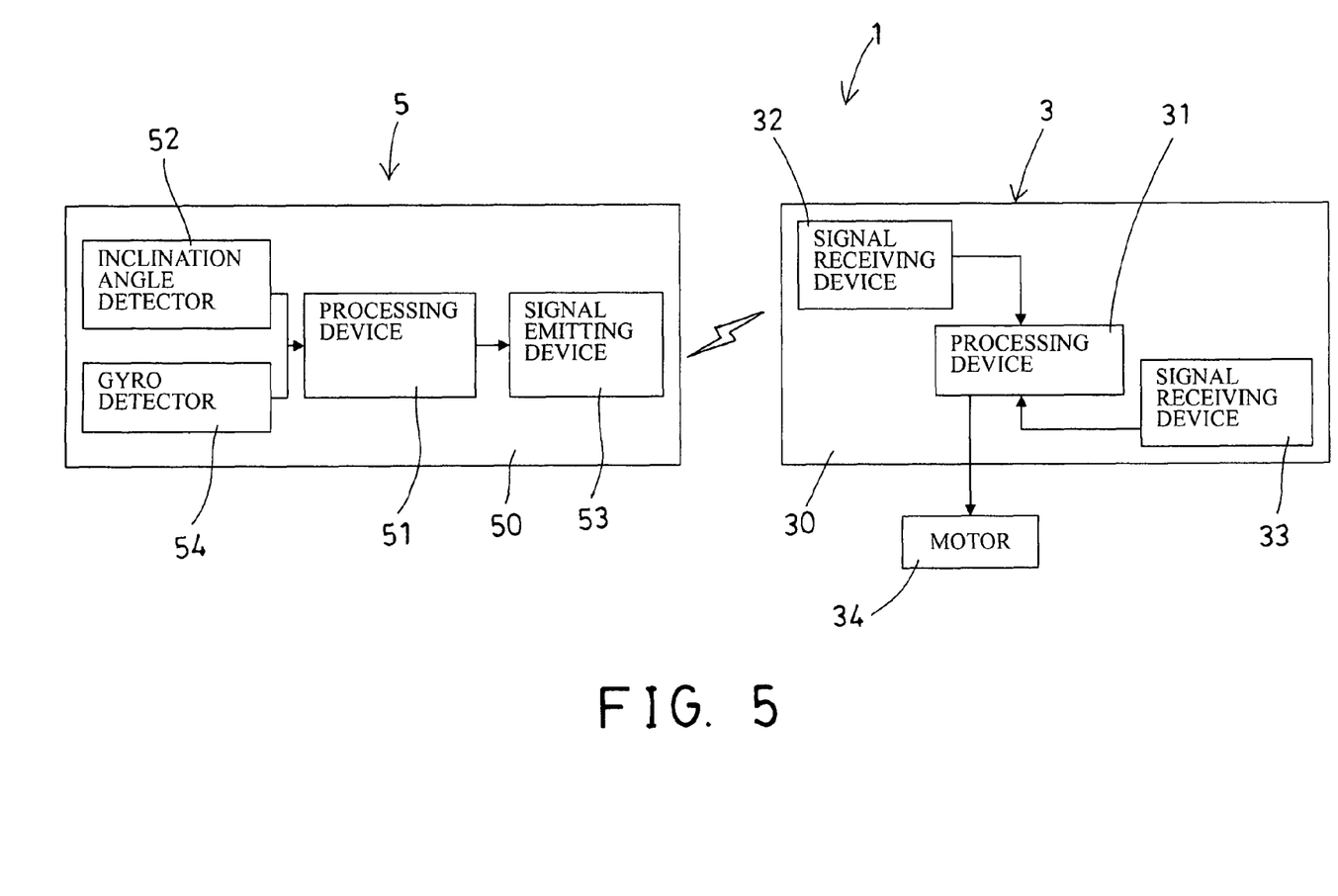
FIG. 5 is a block diagram or plan schematic view illustrating the elements of the remote control ball assembly.

The remote control ball assembly 1 further comprises a remote control device or radio transmitter 5 including another plate or circuit board 50, a controlling or operating or processing device 51 attached or mounted or secured to the circuit board 50, an acceleration sensor or G-sensor or inclination angle detector 52 attached or mounted or secured to the circuit board 50 and electrically coupled or connected to the processing device 51, and a signal emitting device 53, such as infrared ray emitting device 53 attached or mounted or secured to the circuit board 50 and electrically coupled or connected to the processing device 51 for emitting the inclination angle signals detected by the inclination angle detector 52 and processed by the processing device 51. The remote control device or radio transmitter 5 may further include a gyro detector 54 attached or mounted or secured to the circuit board 50 and electrically coupled or connected to the processing device 51 for further sensing or detecting the inclination angle or status or signals of the circuit board 50 and for sending or transmitting the detected signals to the processing device 51.

Figure 6:
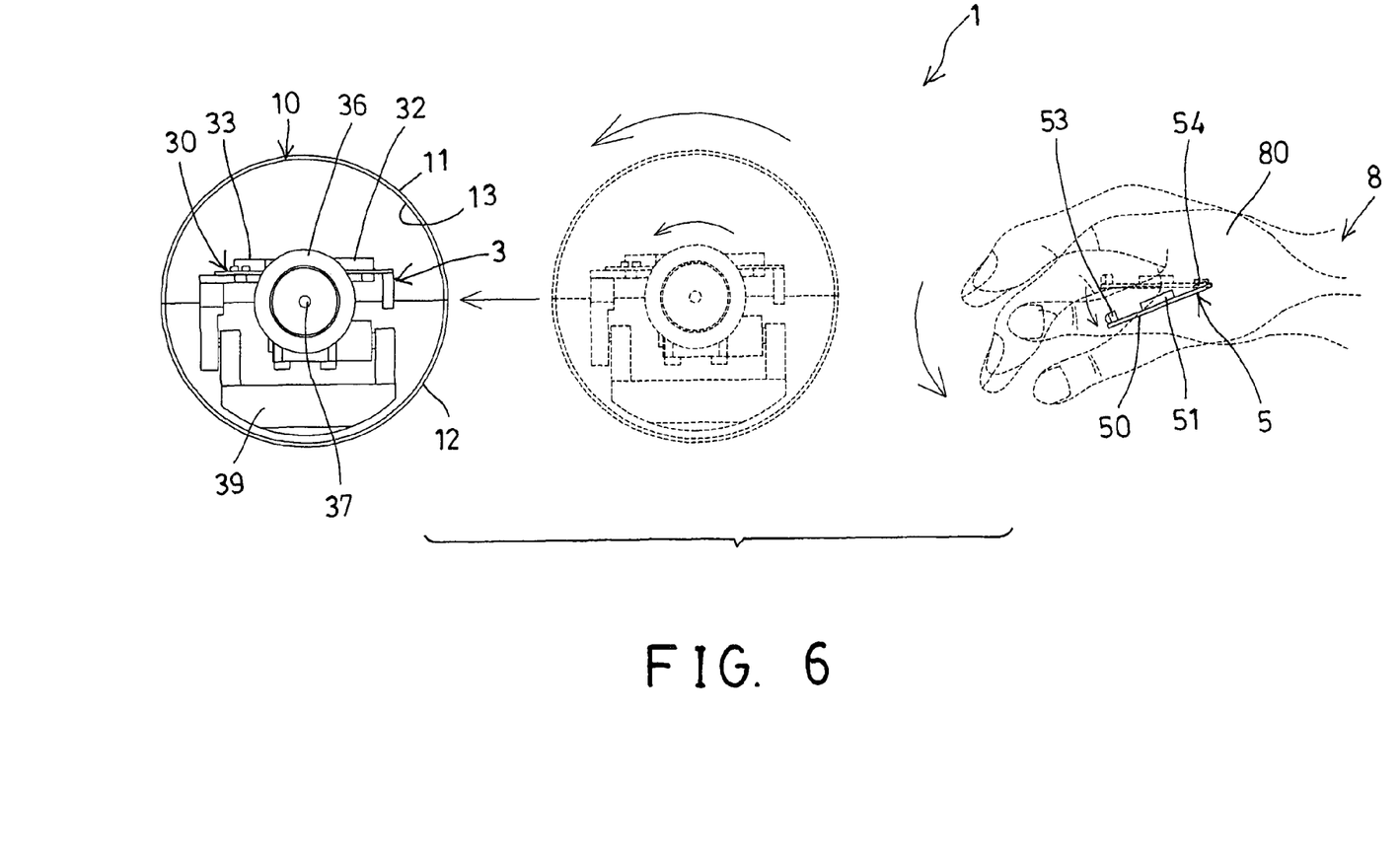
FIGS. 6, 7, 8 are perspective schematic views illustrating the operation of the remote control ball assembly.
Figure 7:
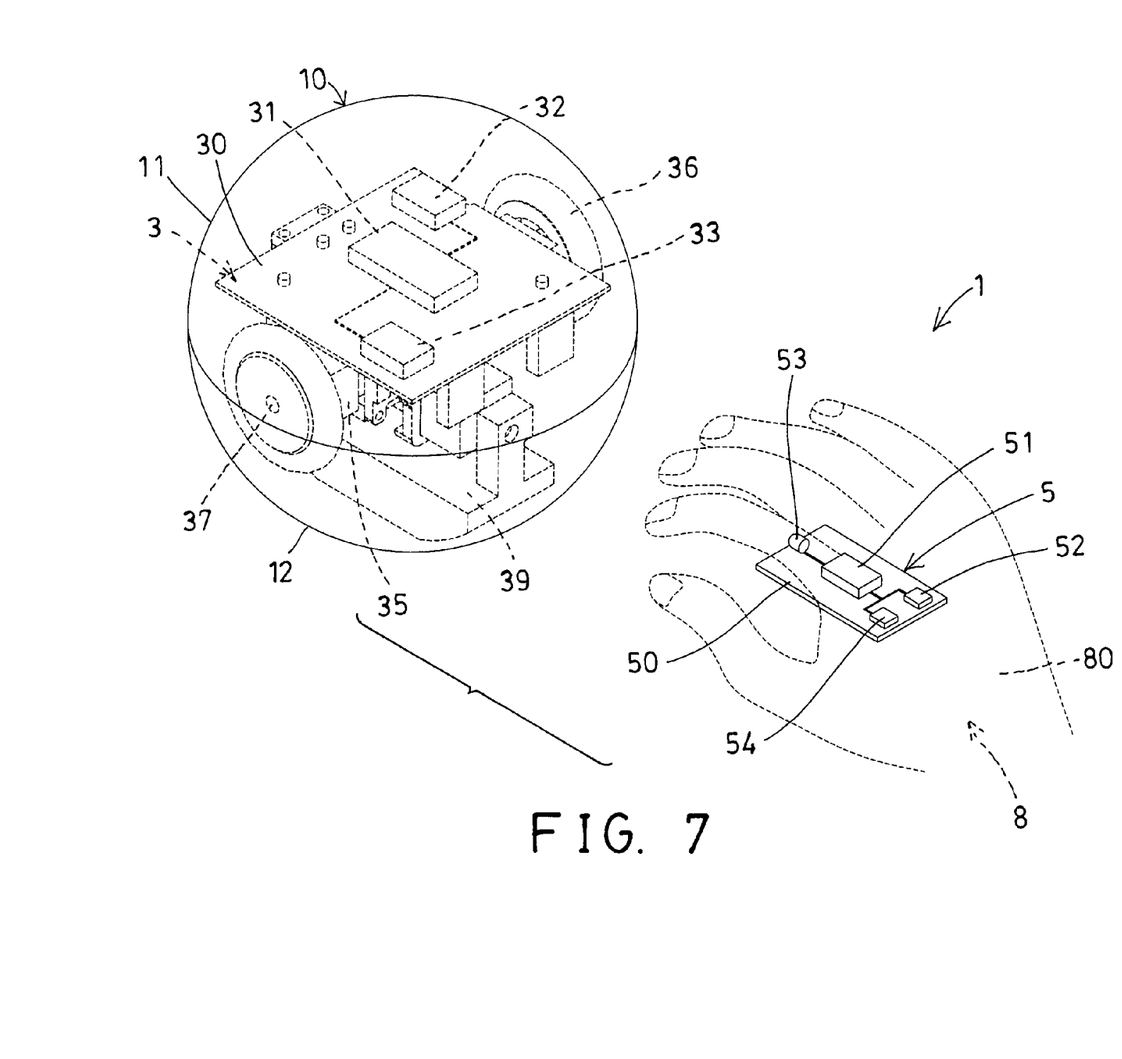
Figure 8:
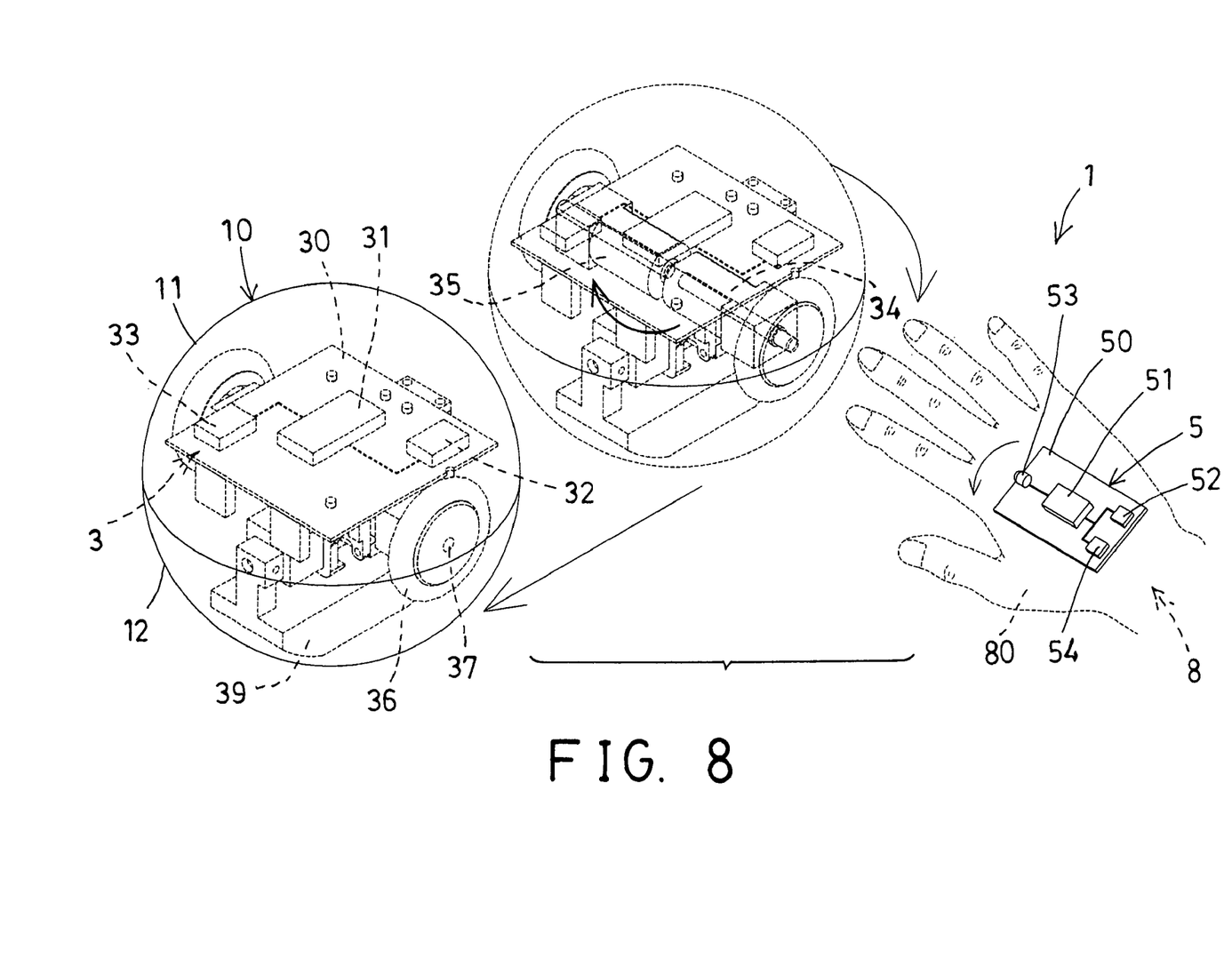

In operation, as shown in FIGS. 6-8, the circuit board 50 and/or the radio transmitter 5 may be carried or held or grasped by the palm or hand 80 of the user 8, and the inclination angle detector 52 and/or the gyro detector 54 may be used to sense or detect the inclination angle or status or signals of the circuit board 50 and the palm or hand 80 of the user 8 and may then send or transmit the detected signals to the processing device 51 which may then process the detected signals into the processed signals and may then actuate or operate the signal emitting device 53 to emit the inclination angle signals to the signal receiving devices 32, 33, and the signal receiving devices 32, 33 may then send or transmit the received signals to the processing device 31, and the motors 34, 35 may then be actuated or operated by the processing device 31 to move or rotate or drive the wheels 36 in the same speed, or in different rotational speed for moving or driving or rotating or maneuvering the housing 10 on land and on water.

For example, as shown in FIG. 8, when the circuit board 50 and/or the radio transmitter 5 are held by the user 8 in a planar or horizontal status, or when the circuit board 50 and/or the radio transmitter 5 have not been carried or held or grasped or moved by the palm or hand 80 of the user 8, the inclination angle detector 52 and/or the gyro detector 54 may not sense or detect any inclination angle or status or signal of the circuit board 50 and the palm or hand 80 of the user 8 and may not supply or send or transmit any detected signals to the processing device 51, such that the signal emitting device 53 may not supply or send or emit the signals to the signal receiving devices 32, 33 at this moment, and such that the housing 10 may not be moved or actuated or operated at this time.

As shown in FIG. 6, when the circuit board 50 and/or the radio transmitter 5 are carried or held or grasped by the palm or hand 80 of the user 8 and are tilted or inclined forwardly, for example, the inclination angle detector 52 and/or the gyro detector 54 may sense or detect that the circuit board 50 and the palm or hand 80 of the user 8 are tilted or inclined forwardly relative to the ground or the like, and may then supply or send or transmit the detected inclination angle or status or signals of the circuit board 50 and the palm or hand 80 of the user 8 relative to the ground or the like to the processing device 51, and the signal emitting device 53 may then supply or send or emit the angle signals to the signal receiving devices 32, 33, which may then send or transmit the received signals to the processing device 31, and the motors 34, 35 may then be actuated or operated by the processing device 31 to move or rotate or drive the wheels 36 and thus to move or drive or maneuver the housing 10 forwardly.

Alternatively, as shown in FIG. 7, when the circuit board 50 and/or the radio transmitter 5 are carried or held or grasped by the palm or hand 80 of the user 8 and are pivoted or rotated relative to the ground or the like, the inclination angle detector 52 and/or the gyro detector 54 may detect and supply or send or transmit the pivoting or rotating signals to the processing device 51, and the signal emitting device 53 may then supply or send or emit the pivoting or rotating signals to the signal receiving devices 32, 33, which may then send or transmit the received signals to the processing device 31, and the motors 34, 35 may then be actuated or operated by the processing device 31 in the same speed, or in different rotational speed in order to actuate the wheels 36 and to move or drive or maneuver or pivot or rotate the housing 10 on land and on water.

It is to be noted that the circuit board 50 and the radio transmitter 5 include no switch keys or buttons to be moved or actuated or operated or depressed by the fingers of the user, particularly the thumb of the user, such that the thumb or the fingers of the user will be fatigued by actuating or operating the remote control device or radio transmitter, it is only required to tilt or incline or pivot or rotate the circuit board 50 and the radio transmitter 5 relative to the ground or the like, and the inclination angle signals or the pivoting or rotating signals of the circuit board 50 and the palm or hand 80 of the user 8 relative to the ground or the like may be directly detected and supplied or sent or emitted to the signal receiving devices 32, 33 in order to actuate the motors 34, and to operate the wheels 36 and to move or drive or maneuver or pivot or rotate the housing 10 on land and on water without being actuated or operated or depressed by the fingers of the user.

Accordingly, the remote control ball assembly in accordance with the present invention includes an improved control mode or structure for allowing the remote control ball to be suitably controlled by the user and for preventing the fingers of the user from being fatigued by actuating or operating the remote control device or radio transmitter.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A remote control ball assembly comprising:
a housing including a chamber formed therein,
an actuating device including a first circuit board disposed in said chamber of said housing, a first processing device attached to said first circuit board, and at least one signal receiving device attached to said first circuit board and electrically coupled to said first processing device,
two motors attached to said first circuit board and electrically connected to said first processing device, said motors each including a spindle and a wheel attached to said spindle, and said wheels being contacted with said housing for allowing said housing to be actuated by said wheels, and a radio transmitter including a second circuit board, a second processing device attached to said second circuit board, an angle detector attached to said second circuit board and electrically coupled to said second processing device for transmitting a detected signal to said second circuit board which processes the detected signal to a processed signal, and a signal emitting device attached to said second circuit board and electrically connected to said second processing device for emitting the processed signal processed by said second processing device to said at least one signal receiving device, and then to said first processing device, in order to actuate said motors and said wheels to operate said housing.

2. The remote control ball assembly as claimed in claim 1, wherein said radio transmitter includes a gyro detector attached to said second circuit board and electrically connected to said second processing device.

3. The remote control ball assembly as claimed in claim 1, wherein said at least one signal receiving device is selected from an infrared ray receiving device.

4. The remote control ball assembly as claimed in claim 1, wherein said signal emitting device is selected from an infrared ray signal emitting device.

5. The remote control ball assembly as claimed in claim 1, wherein said angle detector is selected from a G-sensor.

6. The remote control ball assembly as claimed in claim 1, wherein said radio transmitter includes a weight member for balancing purposes.

7. The remote control ball assembly as claimed in claim 6, wherein said weight member is attached to said motors.

8. The remote control ball assembly as claimed in claim 6, wherein said weight member is attached to said circuit board.

9. The remote control ball assembly as claimed in claim 1, wherein said housing includes a spherical structure.

* * * * *